United States Patent
Paulsen et al.

(10) Patent No.: US 10,205,511 B2
(45) Date of Patent: Feb. 12, 2019

(54) MULTI-BEAM PHASED ARRAY FOR FIRST AND SECOND POLARIZED SATELLITE SIGNALS

(71) Applicant: Rockwell Collins, Inc., Cedar Rapids, IA (US)

(72) Inventors: Lee M. Paulsen, Cedar Rapids, IA (US); Thomas B. Campbell, Cedar Rapids, IA (US); Robert J. Frank, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 15/600,497

(22) Filed: May 19, 2017

(65) Prior Publication Data
US 2018/0337722 A1 Nov. 22, 2018

(51) Int. Cl.
*H04B 7/185* (2006.01)
*H01Q 21/22* (2006.01)
(Continued)

(52) U.S. Cl.
CPC ......... *H04B 7/18513* (2013.01); *H01Q 1/288* (2013.01); *H01Q 21/22* (2013.01);
(Continued)

(58) Field of Classification Search
CPC .. H04B 7/10; H04B 7/18515; H04B 7/18513; H04B 7/2041; H04B 7/18517; H04B 7/0617; H04B 7/18508
(Continued)

(56) References Cited

U.S. PATENT DOCUMENTS

| | | | | |
|---|---|---|---|---|
| 9,843,107 B2 * | 12/2017 | Corman | ................ | H01Q 21/22 |
| 9,848,370 B1 * | 12/2017 | Freedman | ............ | H04B 17/102 |
| 2013/0088391 A1 | 4/2013 | Corman et al. | | |

FOREIGN PATENT DOCUMENTS

| | | |
|---|---|---|
| EP | 1 693 922 A1 | 8/2006 |
| WO | WO-2007/047567 | 4/2007 |

OTHER PUBLICATIONS

European Search Report for EP Application No. 18075006.9 dated Oct. 1, 2018. 9 pages.

* cited by examiner

*Primary Examiner* — Philip Sobutka
(74) *Attorney, Agent, or Firm* — Donna P. Suchy; Daniel M. Barbieri

(57) ABSTRACT

Systems and methods disclose a satellite communication system including a plurality of antenna elements, an interface circuit, and a transceiver circuit. Each antenna element communicates a first polarization signal and a second polarization signal. The interface circuit receives, amplifies, and splits the first polarization signals into a first polarization primary signal and a first polarization secondary signal. The interface circuit also receives, amplifies, and splits the second polarization signals into a second polarization primary signal and a second polarization secondary signal. A first summer circuit generates a first beam signal via a sum of the first and second polarization primary signals. A second summer circuit generates a second beam signal via a sum of the first and second polarization secondary signals. The transceiver includes a first splitter circuit that receives and splits the first beam signal into a first signal and a second signal, a second splitter circuit that receives and splits the second beam signal into a third signal and a fourth signal, a first beamformer that synthesizes a first beamformed signal, (Continued)

and a second beamformer that synthesizes a second beamformed signal.

24 Claims, 7 Drawing Sheets

(51) Int. Cl.
*H01Q 21/24* (2006.01)
*H01Q 1/28* (2006.01)
(52) U.S. Cl.
CPC ......... *H01Q 21/245* (2013.01); *H04B 7/1858* (2013.01); *H04B 7/18508* (2013.01); *H04B 7/18515* (2013.01)
(58) Field of Classification Search
USPC ................... 455/12.1, 3.02, 13.3, 276.1, 273
See application file for complete search history.

MULTI-BEAM PHASED ARRAY FOR FIRST AND SECOND POLARIZED SATELLITE SIGNALS

CROSS-REFERENCE TO RELATED PATENT APPLICATIONS

This application is related to U.S. patent application Ser. No. 15/403,134 filed on Jan. 10, 2017 and U.S. application Ser. No. 15/413,052 filed on Jan. 23, 2017, both of which are assigned to the assignee of the present application, and incorporated herein by reference in their entirety.

BACKGROUND

The present disclosure relates generally to the field of satellite communication. More specifically, the present disclosure relates to airborne satellite communication. Currently, satellite communication systems may be able to provide up to 400 Mbps peak data to an airplane using a constellation of low earth orbit (LEO) satellites, but cannot source more than four-hundred megabytes per second (400 Mbps). Demand for data on airplanes is continually increasing and increasing the data available on airplanes is challenging. As demand for in-flight data usage increases, more than 400 Mbps will be required.

SUMMARY

In one aspect, embodiments of the inventive concepts disclosed herein are directed to a satellite communication system that includes a plurality of antenna elements and an interface circuit. Each antenna element includes a first polarization port that communicates a first polarization signal, and a second polarization port that communicates a second polarization signal. The interface circuit is structured to receive the plurality of first polarization signals, amplify the plurality of first polarization signals, split each of the plurality of first polarization signals into a first polarization primary signal and a first polarization secondary signal and apply independent phase shift and gain shifts to the first polarization primary signal and the first polarization secondary signal, receive the plurality of second polarization signals, amplify the plurality of second polarization signals, split each of the plurality of second polarization signals into a second polarization primary signal and a second polarization secondary signal and apply independent phase shift and gain shifts to the second polarization primary signal and the second polarization secondary signal, sum the plurality of first polarization primary signals and the plurality of second polarization primary signals for a first beam, sum the plurality of first polarization secondary signals and the plurality of second polarization secondary signals for a second beam, translate the first beam to a first intermediate frequency, translate the second beam to a second intermediate frequency, and combine the first beam and second beam onto a common cable. The first beam and the second beam are associated with different data sources.

In a further aspect, embodiments of the inventive concepts disclosed herein are directed to a satellite communication system that includes a plurality of antenna elements, a receive array, and a transceiver. Each antenna element includes a first polarization port that communicates a first polarization signal, and a second polarization port that communicates a second polarization signal. The receive array is structured to receive and sum the first polarization signals, and to receive and sum the second polarization signals. The transceiver includes a first splitter circuit structured to receive the summed first polarization signal and split the summed first polarization signal into a first signal and a second signal, a second splitter circuit structured to receive the summed second polarization signal and split the summed second polarization signal into a third signal and a fourth signal, a first beamformer structured to receive the first signal and the third signal and synthesize a first beamformed signal, and a second beamformer structured to receive the second signal and the fourth signal and synthesize a second beamformed signal. The first beamformed signal and the second beamformed signal are associated with different data sources.

In a further aspect, embodiments of the inventive concepts disclosed herein are directed to a satellite communication system that includes a plurality of antenna elements, an interface circuit, a first summer circuit, a second summer circuit, and a transceiver. Each antenna element includes a first polarization port that communicates a first polarization signal, and a second polarization port that communicates a second polarization signal. The interface circuit is structured to receive the plurality of first polarization signals, amplify the plurality of first polarization signals, split each of the plurality of first polarization signals into a first polarization primary signal and a first polarization secondary signal and apply independent phase shift and gain shifts to the first polarization primary signal and the first polarization secondary signal, receive the plurality of second polarization signals, amplify the plurality of second polarization signals, and split each of the plurality of second polarization signals into a second polarization primary signal and a second polarization secondary signal and apply independent phase shift and gain shifts to the second polarization primary signal and the second polarization secondary signal. The first summer circuit is structured to generate a first beam signal via a sum of the plurality of first polarization primary signals and the plurality of second polarization primary signals. The second summer circuit is structured to generate a second beam signal via a sum of the plurality of first polarization secondary signals and the plurality of second polarization secondary signals. The transceiver includes a first splitter circuit that is structured to receive the first beam signal and split the first beam signal into a first signal and a second signal, a second splitter circuit that is structured to receive the second beam signal and split the second beam signal into a third signal and a fourth signal, a first beamformer that is structured to receive the first signal and the third signal and synthesize a first beamformed signal, and a second beamformer that is structured to receive the second signal and the fourth signal and synthesize a second beamformed signal. The first beamformed signal and the second beamformed signal are associated with different data sources.

In a further aspect, embodiments of the inventive concepts disclosed herein are directed to a satellite communication system that includes a plurality of antenna elements and an interface circuit. Each of the plurality of antenna elements includes a first polarization port communicating a first polarization signal, and a second polarization port communicating a second polarization signal. The interface circuit is structured to separate two data source signals on a common cable at intermediate frequencies into a first beam signal and a second beam signal, translate the first beam signal to a communications channel frequency, translate the second beam signal to a communications channel frequency, split the first beam signal into a plurality of first beam primary polarization signals and a plurality of first beam secondary polarization signals, split the second beam signal into a plurality of second beam primary polarization signals and a plurality of second beam secondary polarization signals, apply independent phase shifts and gain shifts to the plurality of the first beam primary polarization signals, apply independent phase shifts and gain shifts to the plurality of the second beam primary polarization signals, combine the first beam primary polarization signals and second beam primary polarization signals into a plurality of combined primary polarization signals, amplify the plurality of combined primary polarization signals, radiate the plurality of combined primary polarization signals, apply independent phase shifts and gain shifts to the plurality of the first beam secondary polarization signals, apply independent phase shifts and gain shifts to the plurality of the second beam secondary polarization signals, combine the first beam secondary polarization signals and second beam secondary polarization signals into a plurality of combined secondary polarization signals, amplify the plurality of combined secondary polarization signals, and radiate the plurality of combined secondary polarization signals. The first beam signals and the second beam signals are associated with different data sources.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Future data demands will be larger than 400 Mbps. Systems and methods described herein provide increased gross data capacity and multi-mode operation. Multi-mode operation can be used to support data links (e.g., airplane navigation and communication systems, internet access for passengers) and internet protocol television (IPTV).

In some embodiments, a single antenna installation supports connectivity to multiple constellations and/or both IPTV and data beams simultaneously. In some embodiments, increased gross data capacity and multi-mode operation are provided without requiring systems and methods including multiple antenna arrays, installations on the aircraft, or without adversely affecting the size, weight, power, and cost (SWaP-C) factors.

Referring generally to the figures, systems for and methods of multi-beam phased array satellite communication are described according to some exemplary embodiments. In some embodiments, an airborne satellite communication antenna simultaneously supports connectivity to multiple satellite constellations or to both IPTV and data links simultaneously in order to meet airborne data needs. Airborne satellite communication systems may communicate with LEO satellites and/or geostationary or geosynchronous (GEO) satellites.

In some embodiments, an airplane satellite communication system can simultaneously support connectivity to multiple satellite constellations and provides seamless global coverage. A satellite communication system communicates via multiple beamforming signal paths in a primary beamforming chip behind radiator/antenna elements to synthesize beams towards multiple satellites with a wide angular separation. In some embodiments, the satellite communication system supports wider frequency operation with a single satellite (e.g. IPTV & Data) by implementing a second-level multi-beam beamformer at a subarray level.

Figure 1:
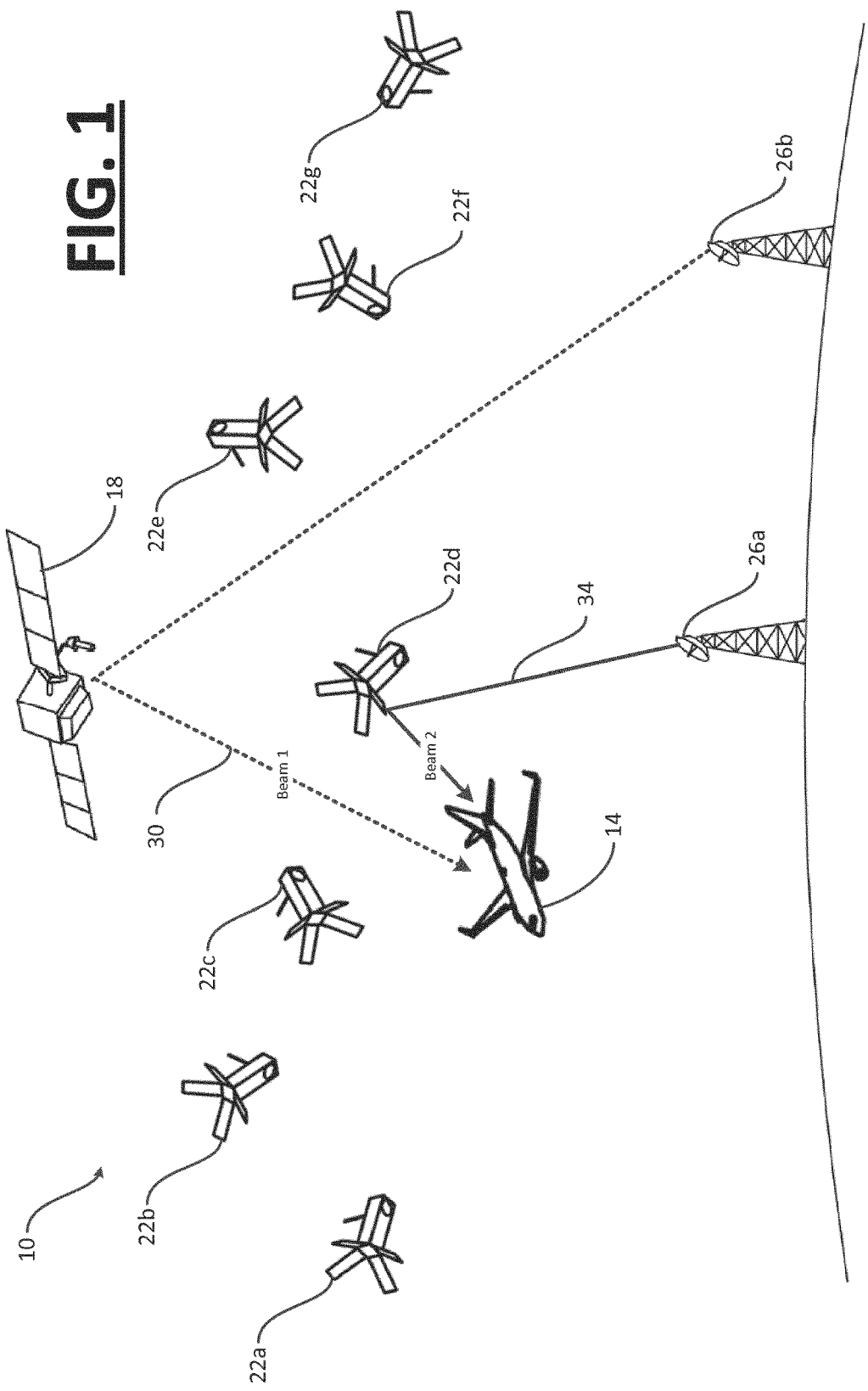
FIG. 1 is a perspective view schematic drawing of a satellite based aviation communication network in communication with an aircraft according to some embodiments.

With reference to FIG. 1, an environment 10 includes an aircraft 14, a GEO satellite 18, LEO satellites 22a-g, a first ground station 26a, and a second ground station 26b. The aircraft 14 communicates with the GEO satellite 18 which is part of a GEO satellite network or constellation via a first beam 30 sourced from the first ground station 26a. In some embodiments, the GEO satellite 18 can communicate with one or more medium earth orbit (MEO) satellites. The aircraft 14 also communicates with the LEO satellite 22d of the LEO satellites a-g which are part of a LEO satellite constellation via a second beam 34 sourced from the second ground station 26b. The beams 30, 34 represent transmit and/or receive beams in some embodiments. A satellite constellation as used herein refers to two or more satellites (which may be operated by different owners and operators) arranged in one or more networks or one or more orbital types. In some embodiments, the aircraft 14 could communicate with two or more satellites, two or more from the same constellation or each from different constellations. While two ground stations are shown, more than two ground stations or less than two ground stations can be included or utilized. In some embodiments, both the GEO satellite 18 and the LEO satellite 22d are in communication with the same ground station.

Advantageously, the aircraft 14 is capable of simultaneously or near simultaneously communicating with more than one satellite constellation. For example, the aircraft 14 communicates via the beams 30, 34 with the GEO satellite 18 and the LEO satellite 22d. In some embodiments, aircraft 14 can simultaneously communicate with three or more satellites, with the ground station 26 when within range, and/or with two or more satellite constellations.

Figure 2:
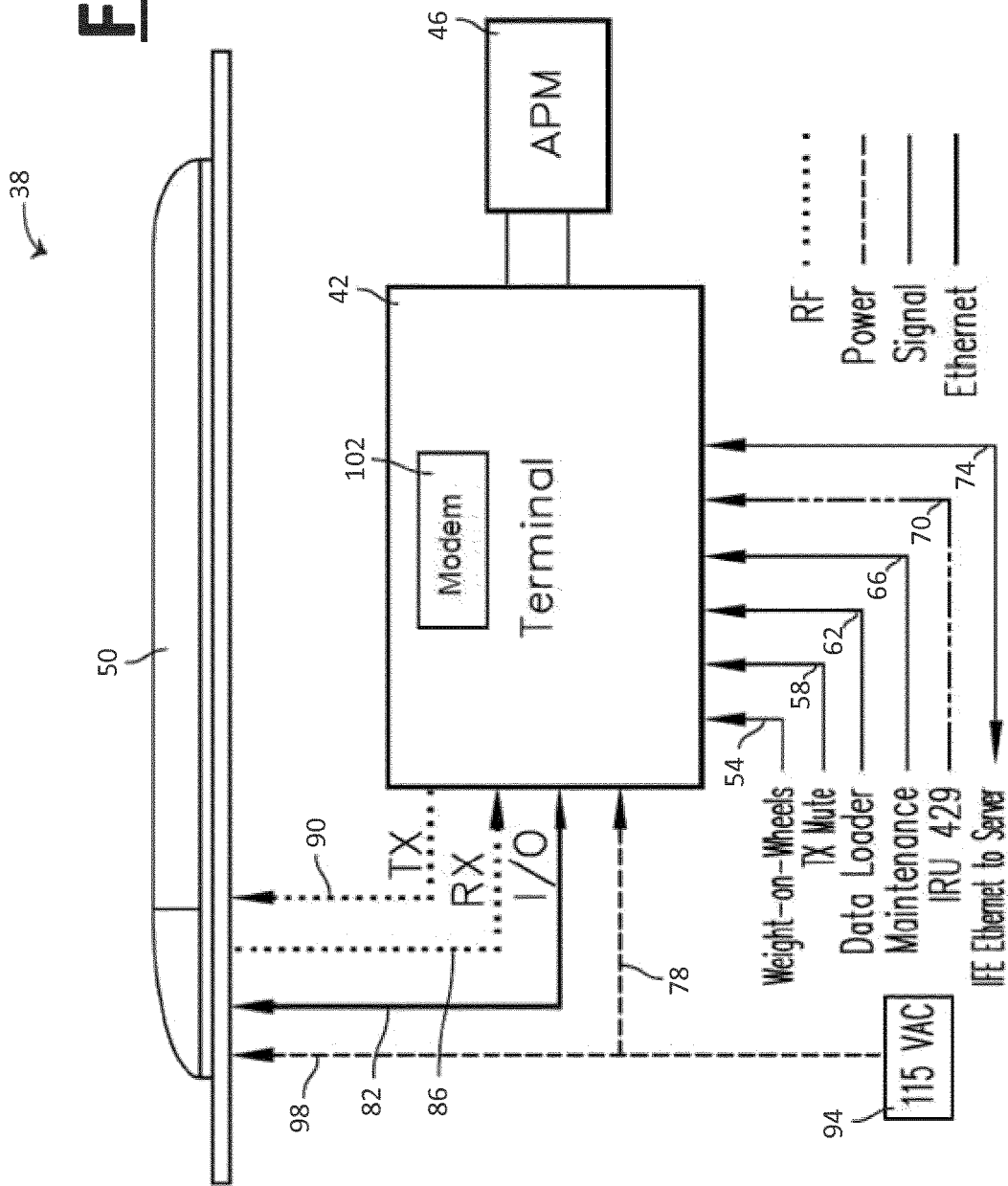
FIG. 2 is a planar side view schematic drawing of a satellite communication system including a terminal (shown in block diagram form) and a phased array antenna assembly according to some embodiments.

With reference to FIG. 2, the aircraft 14 (FIG. 1) is equipped with a communication system 38 including a terminal 42, an aircraft personality module (APM) 46, and an antenna assembly 50. The terminal 42 receives a weight on wheels signal at an input 54, a transmit mute signal at an input 58, a data loader at an input 62, a maintenance signal at an input 66, inertial reference unit (IRU) 429 signals at a bus input 70 and Ethernet signals at a input bus 74. Alternative other inputs and outputs can be provided to terminal 42. The inputs 54, 58, 62, 66, 70, 74 can be coupled with various types of equipment on the aircraft 14 and line replaceable units. The inputs 54, 58, 62, 66, 70, 74 are input/output terminals capable of bi-directional communication in some embodiments. The terminal 42 responds to the various signals on the inputs 54, 58, 62, 66, 70, 74 for enabling communications and maintenance of the communication system 38.

The APM 46 stores configuration data and can be used with a network interface controller for the aircraft 14. The APM 46 includes a SIM card for storing information for the terminal 42. The APM 46 provides identification information for the terminal 42 and the modem(s) inside the terminal 42. In some embodiments, the terminal 42 is replaceable without replacing the APM 46.

The terminal 42 is powered via a power input 78. An input/output (I/O) bus 82 is also coupled to the terminal 42 and the antenna assembly 50. The I/O bus 82 allows control and data signals to be communicated between the terminal 42 and the antenna assembly 50. A receive line 86 is coupled between the terminal 42 and the antenna assembly 50 for radio frequency (RF) receive signals and a transmit line 90 is coupled between the terminal 42 and the antenna assembly 50 for RF transmit signals. The RF signals are intermediate frequency (IF) signals or baseband signals in some embodiments. A power source 94 provides power to the terminal 42 via the power input 78 and to the antenna assembly 50 via an input 98. The terminal 42 includes a modem circuit 102. The modem circuit 102 provides modulation and demodulation operations for the communication system 38.

The antenna assembly 50 is disposed on the aircraft 14 at various locations. The antenna assembly 50 is disposed outside of the fuselage of the aircraft 14 for transmitting and receiving RF signals to and from satellite networks in some embodiments. In some embodiments, the antenna assembly 50 is disposed on a top portion of the aircraft 14. In some embodiments, the antenna assembly 50 is an active electronically scanned array (AESA) antenna system for the communication system 38 that is installed on an outside skin of the aircraft 14 (FIG. 1).

In some embodiments, the satellite communication system 38 is configured for element level multi-beam formation. The element level multi-beam formation provides multiple beamforming signal paths to synthesize beams toward multiple satellites with a wide angular separation. In some embodiments, the satellite communication system 38 is configured for subarray beamforming that supports a wide frequency operation on a single satellite (e.g. IPTV & Data) by implementing a second-level multi-beam beam former at a subarray level. In some embodiments, a single user on the aircraft 14 receives a first non-zero portion of a data from one network using the first beam 30 and a second non-zero portion of the data from another network using the second beam 34.

Figure 3:
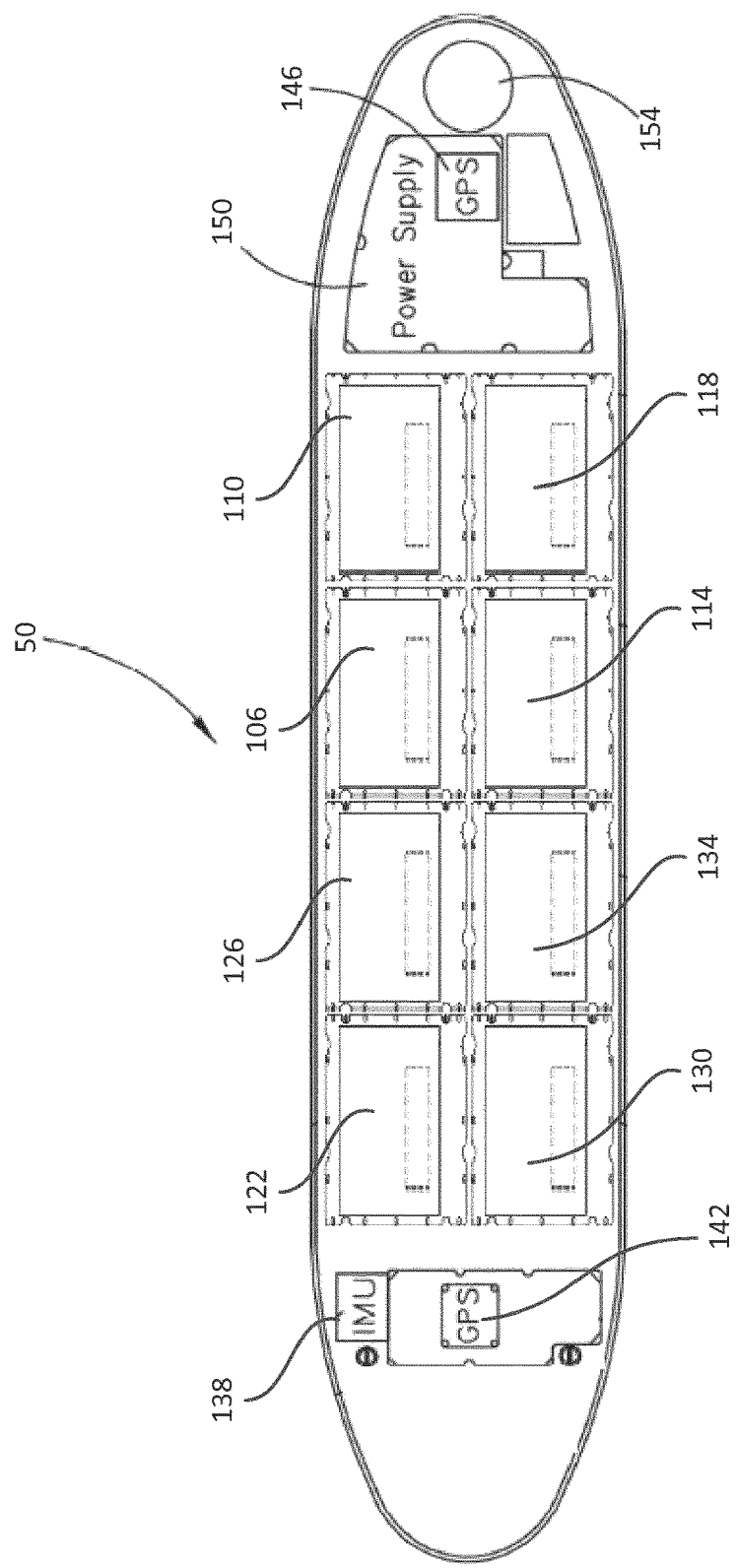
FIG. 3 is a planar top view schematic drawing of the phased array antenna system of the satellite communication system illustrated in FIG. 2 according to some embodiments.

With reference to FIG. 3, the antenna assembly 50 includes four receive (Rx) collocated communications antenna arrays (CCAs) 106, 110, 114, and 118 that provide a combined aperture capable of providing operation in a low power satellite network environment in some embodiments. In some embodiments, the antenna assembly 50 includes different numbers Rx CCAs (e.g., three Rx CCAs, five Rx CCAs, etc.). In some embodiments, the configuration of the Rx CCAs 106, 110, 114, and 118 provide sufficient aperture and redundancy to maintain high quality performance with two or more of LEO, MEO, and/or GEO based satellite networks. In some embodiments, the antenna assembly 50 includes four transmit (Tx) CCAs 122, 126, 130, and 134, an inertial measurement unit 138, a global navigation satellite system (GNSS) receiver 142, a GNSS receiver 146, a power supply 150, and a bulkhead pressure seal 154. In some embodiments, the CCAs 106, 110, 114, and 118 are circuit board-based ASEAs. Additional Tx CCAs 122, 126, 130, and 134 can be provided to meet transmit throughput demands.

The GNSS receivers 142 and 146 communicate with GNSS satellites to determine positioning for the satellite communication system 38. The use of two GNSS receivers 142 and 146 allows differential positioning to be utilized for more accurate position determination including heading and tilt determinations for the antenna assembly. The positioning determinations are augmented using the inertial measurement unit 138 in some embodiments. The inertial measurement unit 138 is different than the inertial reference system of the aircraft 14. The placement of the inertial measurement unit 138 and the GNSS receivers 142 and 146 in the antenna assembly 50 reduces inaccuracies due to the dynamic structure of the aircraft 14 and the difference in position between the positioning sensors of the aircraft 14 and the antenna assembly 50 and allow a narrow beam to be more precisely pointed in some embodiments.

In some embodiments, the satellite communication system 38 is configured to receive television signals (e.g., continuous video signals) from the GEO satellite 18 and receive data signals (e.g., Internet data) from the LEO satellite 22d satellite 22d. In some embodiments, the satellite communication system 38 locks on the GEO satellite 18 to receive TV signals and uses other beams working in concert with the transmit beam to track a LEO satellite 40a-g for data communication.

Figure 4:
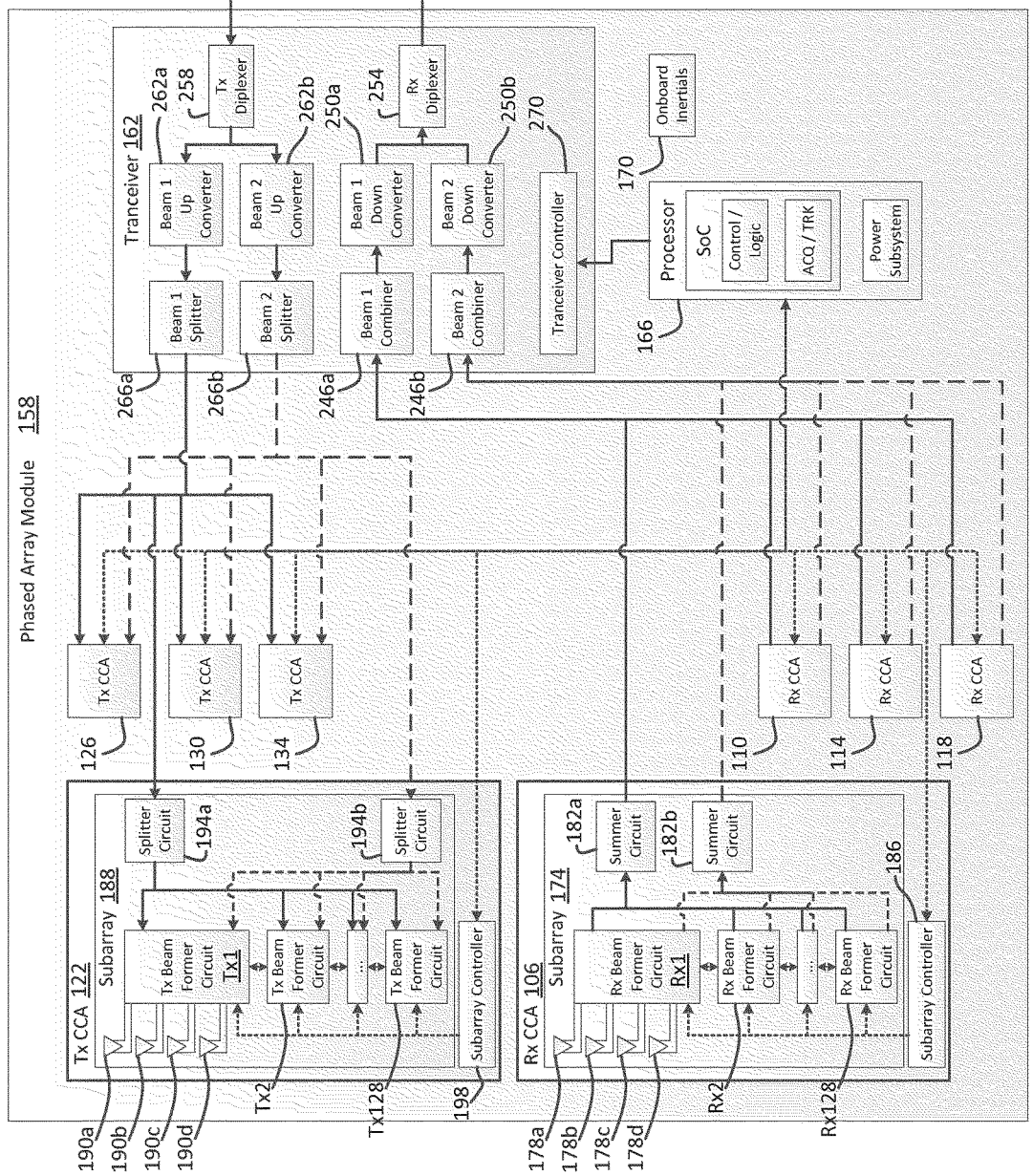
FIG. 4 is a schematic block diagram of a phase array module including a transceiver and antenna arrays of the phased array antenna assembly of the satellite communication system illustrated in FIG. 2 according to some embodiments.

With reference to FIG. 4, a phased array module 158 for the communication system 38 (FIG. 2) includes the Tx CCAs 122, 126, 130, and 134, the Rx CCAs 106, 110, 114, and 118, a transceiver 162, and a processor 166. The phased array module 158 includes components of the terminal 42 and the antenna assembly 50 in some embodiments. In some embodiments, the phased array module 158 is located in the antenna assembly 50. In some embodiments, the phased array module 158 includes on board inertial circuitry 170. In some embodiments, the phased array module 158 is configured to support links (e.g., the beams 30, 34) to multiple constellations simultaneously or near simultaneously.

The processor 166 is configured to provide antenna control based on satellite ephemeris, transition table, phase array module (PAM) state information, firmware image, and received signal strength (RSSI) status. The processor 166 is part of one or more of GNSS receivers 142 and 146 and includes Ethernet communication circuitry and Tx/Rx timing circuitry in some embodiments. The processor 166 includes AESA and transceiver control, command and logic circuitry in some embodiments.

The Rx CCAs 106, 110, 114, and 118 each include a sub array 174 including four antenna elements 178a-d, Rx beam former circuits Rx1-Rx128, summer circuits 182a and 182b, and a subarray controller 186. The illustrated sub array 174 of the Rx CCA 106 includes one hundred twenty eight Rx beam former circuits Rx1-Rx128. In other embodiments, each sub array 174 can include less than one hundred twenty eight Rx beam former circuits or more than one hundred twenty eight Rx beam former circuits. In FIG. 4, the Rx beam former circuits Rx3-Rx127 are depicted as a box positioned between the Rx beam former circuit Rx2 and the Rx beam former circuit Rx128. The Rx beam former circuits Rx2-Rx128 are substantially similar to the Rx beam former circuit Rx1.

In some embodiments, each Rx beam former circuit Rx1-Rx128 of the Rx CCAs 106, 110, 114, and 118 can include four antenna elements 178a-d that are receiving signals in a frequency range between 10.7 and 12.75 (GHz). In other embodiments, each Rx beam former circuit Rx1-Rx128 can include less than four antenna elements or more than four antenna elements. In some embodiments, each Rx beam former circuit Rx1-Rx128 can include up to twelve antenna elements.

Each of the radiator or antenna elements 178a-d includes a first port that provides a first polarization input signal in the form of a vertical polarization signal V1-4 and a second port that provides a second polarization input signal in the form of a horizontal polarization signal H1-4 to the Rx beam former circuits Rx1-Rx128. In some embodiments, the first polarization input signal is a horizontal polarization signal and the second polarization signal is a vertical polarization signal. In other embodiments, circular or elliptical polarization is used. The frequency ranges, antenna element numbers, and matrix sizes discussed above are exemplary only; other configurations are possible.

Utilizing the separate first polarization signal and the second polarization signal, the phased array module 158 is able to provide element level multi-beamforming and/or subarray multi-beamforming. In some embodiments, element level multi-beamforming includes splitting each of the first polarization signals and the second polarization signals and then performing parallel beamforming operations on each duplicate of the split signals (e.g., via phase and gain shifts, and summing). Element level multi-beamforming can increase steering flexibility between multiple beams. Increased steering flexibility can improve support of fast moving LEO satellites and fixed GEO satellites, to provide continuous worldwide service. In some embodiments, subarray multi-beamforming includes splitting the first polarization signal and the second polarization signal and synthesizing multiple beams at a subarray level. Subarray multi-beamforming provides improved performance of multiple synthesized beams within the beamwidth of the subarray. In some embodiments, subarray multi-beamforming provides support for multiple closely-spaced satellites or both data beams and IPTV broadcast beams simultaneously. Subarray multi-beamforming can also improve performance over frequency.

Each of the Tx CCAs 122, 126, 130, and 134 are substantially the same. Below the Tx CCA 122 is described with the understanding that descriptions also apply to the Tx CCAs 126, 130, and 134. The Tx CCA 122 includes a subarray 188 including four antenna elements 190a-d, Tx beam former circuits Tx1-Tx128, splitter circuits 194a and 194b, and a subarray controller 198. In some embodiments, the Tx CCA 122 includes four antenna elements 190a-d that are providing signal in a frequency range between 14 and 14.5 giga Hertz (GHz). Each of the antenna elements 190a-d transmits a first polarization input signal and a second polarization input signal provided by the Tx beam former circuits Tx1-Tx128. The first polarization input signal is a vertical polarization signal and the second polarization signal is a horizontal polarization signal in some embodiments. Alternative polarization formats can be utilized.

The splitter circuits 194a and 194b provide the first polarization signal and the second polarization signal to the Tx beam former circuits Tx1-Tx128. The Tx beam former circuits Tx1-Tx128 are silicon germanium phase adjustment and variable amplifier circuits under control of the subarray controller 146 in some embodiments. The subarray controller 198 controls the appropriate amount of gain and phase for the first polarization input signal and the second polarization signal to effect beam pointing to the satellites 18, 22a-g. The processor 166 provides positioning data to the subarray controller 198 so that the beams are pointed in appropriate directions.

In some embodiments, the first polarization signal is provided for a first beam and the second polarization signal is provided for a second beam. In some embodiments, the combination of the first polarization signal and the second polarization signal allow different polarization formats to be formed. In some embodiments, the first polarization signal from the transceiver 162 is provided to the splitter circuit 142a and the second first polarization signal is provided to the splitter circuit 142a. Split versions of the first and second polarization signals are amplified and phase delayed in the Tx beam former circuits Tx1-Tx128 for provision to the antenna elements 190a-d.

Figure 5:
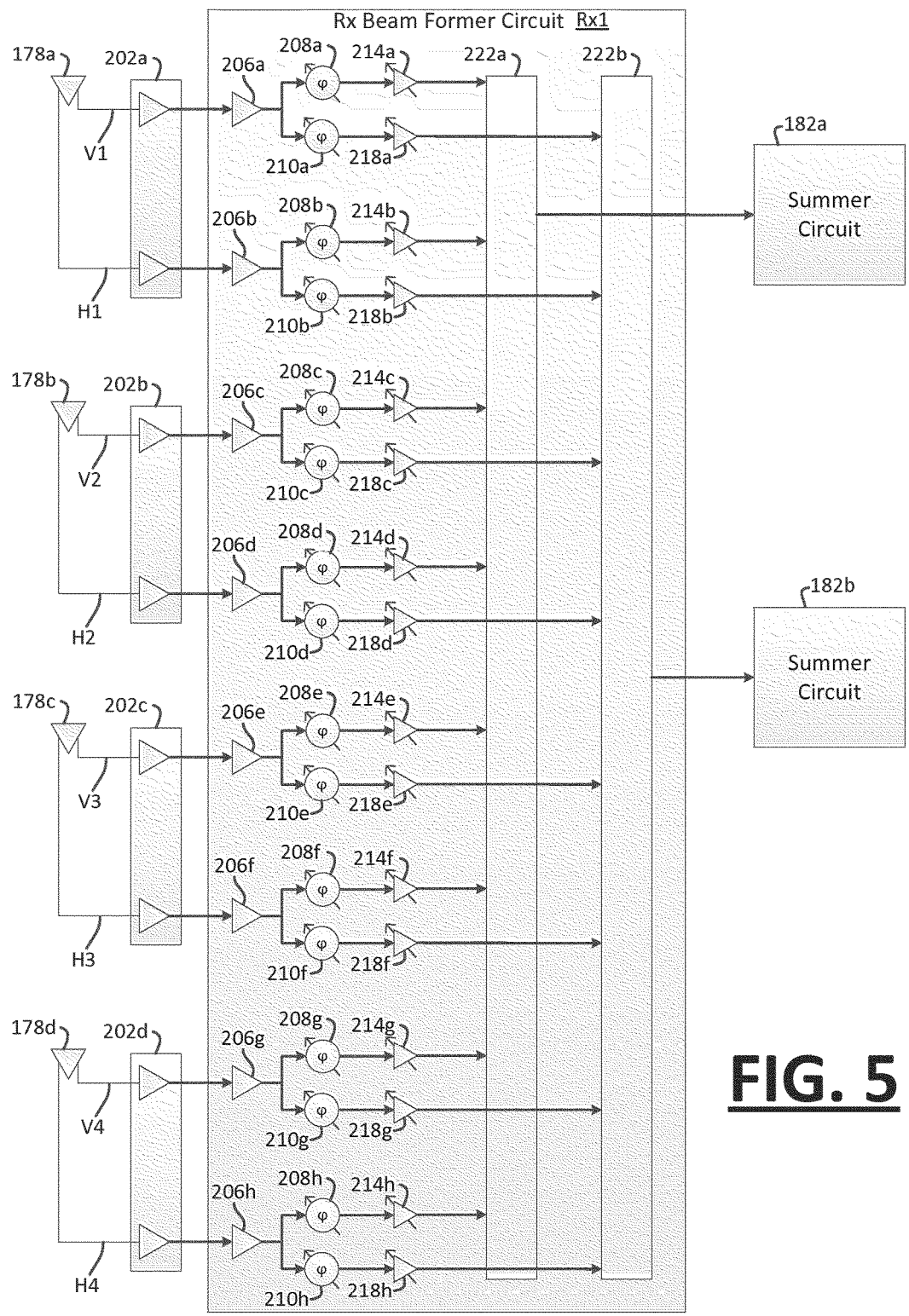
FIG. 5 is a schematic block diagram of a Rx beam former circuit for a phase array module of the satellite communication system illustrated in FIG. 2 according to some embodiments.

With reference to FIG. 5, the Rx beam former circuits Rx1-Rx128 each include like parts. The Rx beam former circuit Rx1 is discussed below, and it is recognized that other Rx beam former circuits Rx2-Rx128 are similar. The Rx beam former circuit Rx1 includes a set of amplifiers in the form of front end low noise amplifiers 202a-d, a set of buffers 206a-h, a set of phase control or time delay circuits 208a-h, a set of phase control or time delay circuits 210a-h, a set of variable gain amplifiers 214a-h, a set of variable gain amplifiers 218a-h, a summer circuit 222a, and a summer circuit 222b. The front end low noise amplifiers 202a-d receive the vertical polarization signals V1-4 and the horizontal polarization signals H1-4 and pass the amplified signals to the buffers 206a-h. After the buffers 206a-h, each polarization signal (e.g., the vertical polarization signal V1 or the horizontal polarization signal H1) is split into the phase control circuits 208a-h and 210a-h, and the variable gain amplifiers 214a-h and 218a-h.

In some embodiments, the vertical polarization signals are modified via phase shift and amplification into a vertical polarization primary signal that is sent to the summer circuit 222a, and a vertical polarization secondary signal that is sent to the summer circuit 222b. The horizontal polarization signals are modified via phase shift and amplification into a horizontal polarization primary signal that is sent to the summer circuit 222a, and a horizontal polarization secondary signal that is sent to the summer circuit 222b. Each of the signals received from the antenna elements 178a-d is dealt with similarly, so that the summer circuit 222a receives each primary signal and the summer circuit 222b receives each secondary signal. In this way, multi-beam communication is provided at an element level. The summer circuit 222a is structured to output a first beam signal and the summer circuit 222b is structured to output a second beam signal. In some embodiments, the first beam signal and the second beam signal are associated with different data sources.

Improved steering flexibility is provided by splitting the signals V1-4 and H1-4 received from the antenna elements 178a-d and then performing parallel beamforming operations on each duplicate of the signals (e.g., by applying an independent phase shift and gain shift to V1, H1, V2, H2 through V4 and H4 and then summing signals into two independent beams). This allows the beam output to the summer circuit 182a to communicate with a different source than the beam output to the summer circuit 182b. In one embodiment, the beam output to the summer circuit 182a is received from a first satellite (e.g., the satellite 20) and the beam output to the summer circuit 182b is received from a second satellite (e.g., the satellite 22d). Providing multiple beamforming signal paths in the primary beamforming chip behind the antenna elements 178a-d allows the phased array module 158 to synthesize beams toward multiple satellites with a wide angular separation.

Figure 6:
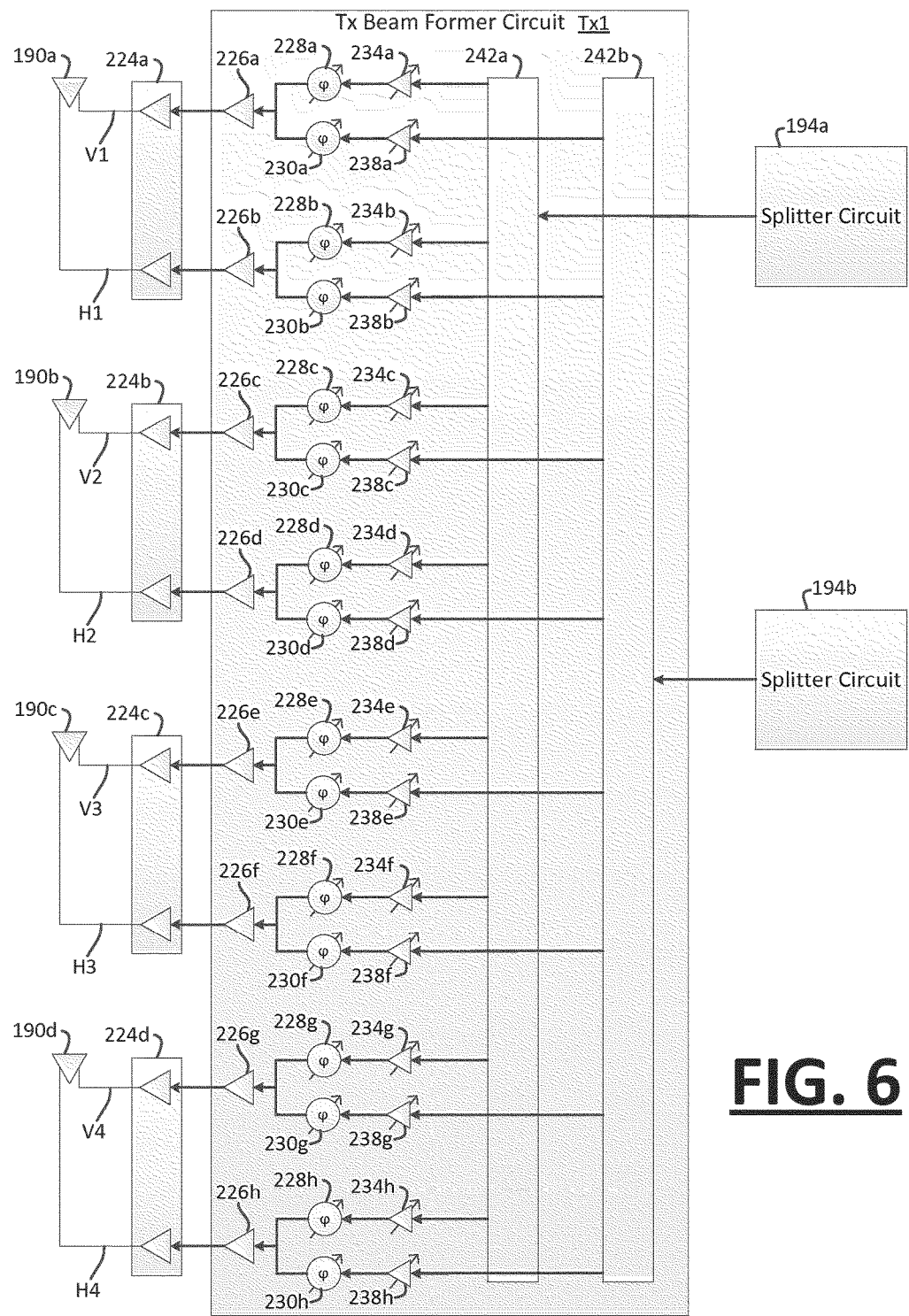
FIG. 6 is a schematic block diagram of a Tx beam former circuit for a phase array module of the satellite communication system illustrated in FIG. 2 according to some embodiments.

With reference to FIG. 6, the Tx beam former circuits Tx1-Tx128 each include like parts. The Tx beam former circuit Tx1 is discussed below, and it is recognized that other Tx beam former circuits Tx2-Tx128 are similar. The Tx beam former circuit Tx1 includes a set of amplifiers in the form of front end low noise amplifiers 224a-d, a set of buffers 226a-h, a set of phase control or time delay circuits 228a-h, a set of phase control or time delay circuits 230a-h, a set of variable gain amplifiers 234a-h, a set of variable gain amplifiers 238a-h, a splitter circuit 242a, and a splitter circuit 242b.

The splitter circuit 242a is structured to receive a beam input from the splitter circuit 194a, and the splitter circuit 242b is structured to receive a beam input from the splitter circuit 194b. Improved transmission steering flexibility is provided by performing parallel beamforming operations on each beam input (e.g., by applying an independent phase shift and gain shift to the beam inputs to develop split V1, H1, V2, H2 through V4 and H4 and sending the split signals to the antenna elements 190-d). Parallel beamforming allows the beam input from the splitter circuit 194a to communicate with a different source than the beam input from the splitter circuit 194b. In one embodiment, the beam input from the splitter circuit 194a is transmitted to a first satellite (e.g., the satellite 18) and the beam input to the splitter circuit 194b is transmitted to a second satellite (e.g., the satellite 22d). Providing multiple beamforming signal paths in the primary beamforming chip behind the antenna elements 190a-d allows the phased array module 158 to synthesize beams toward multiple satellites with a wide angular separation.

With reference back to FIG. 4, in some embodiments, the Rx beam former circuits Rx1-Rx128 are silicon germanium phase adjustment and variable amplifier circuits under control of the subarray controller 186. Additionally, in some embodiments, the Tx beam former circuits Tx1-Tx128 are silicon germanium phase adjustment and variable amplifier circuits under control of the the subarray controller 198. The subarray controller 186 and the subarray controller 198 control the appropriate amount of gain and phase for the polarization input signals to effect beam pointing to the satellites 18, 22a-g. The processor 166 provides positioning data to the subarray controller 186 and the subarray controller 198 so that the beams are appropriately pointed.

The summer circuit 182a receives the first beam signals from the Rx beam former circuits Rx1-Rx128, and generates a summed first beam signal. Similarly, the summer circuit 182b receives the second beam signals from the Rx beam former circuits Rx1-Rx128, and generates a summed second beam signal.

The transceiver 162 includes a first beam combiner circuit 246a, a second beam combiner circuit 246b, a first beam down converter circuit 250a, and a second beam down converter circuit 250b, and a Rx diplexer 254. The beam combiner circuits 246a and 246b and the beam down converter circuits 250a and 250b provide separate receive paths for two beams in some embodiments. The first beam combiner circuit 246a and the second beam combiner circuit 246b combine the respective beam signals from the summer circuits 182a and 182b from the Rx CCAs 106, 110, 114, and 118. The beam down converter circuits 250a and 250b translate the signals down to the appropriate intermediate frequency to prevent interference between the first beam signal and second beam signals when further combined in the Rx diplexer 254.

The structure of the transceiver 162 allows the beam signals to be separated and multiple beams synthesized at a subarray level (e.g., after 512 elements). The transceiver 162 can synthesize these multiple beams within the beamwidth of the subarray (e.g., the subarray 174). In some embodiments, the beamwidth of the subarray is about eight degrees allowing separate beams (e.g., beam 1 and beam 2) to be supported by multiple closely-spaced satellites or two separate data sources from one satellite (e.g., a data spot beam and an IPTV beam).

The transceiver 162 also includes a Tx diplexer 258 structured to receive a single beam input signal and out two beam signals. A first beam signal is fed to a first beam up converter 262a and a second beam signal is fed to a second beam up converter 262b to translate the signals up to an appropriate intermediate frequency to prevent interference between the first beam signal and second beam signal.

The first beam up converter 262a feeds the up converted first beam signal to a first beam splitter circuit 266a, and the second beam up converter 262b feeds the up converted second beam signal to a second beam splitter circuit 266b. The first beam splitter 266a provides four outputs. Each of the outputs is received by the splitter circuit 194a of one of the Tx CCAs 122, 126, 130, and 134. The second beam splitter s66b also provides four outputs. Each output is received by the splitter circuit 194b of one of the Tx CCAs 122, 126, 130, and 134.

Once received within the individual Tx CCAs 122, 126, 130, and 134, the first beam signals and the second beam signals are driven through the Tx beam former circuits Tx1-Tx128, and fed to the antenna elements 190a-d.

A transceiver controller 270 is structured to control operation of the transceiver 162. In some embodiments, a transmit IF signal is provided in a 0.95-1.95 GHz frequency range for GEO satellites and a 4.05-4.175 GHz range for LEO satellites. IF receive signals for GEO satellites can be in a frequency range of 0.95-2.15 GHz, and the IF receive signals for LEO satellites can be in a frequency range of 1.85-2.1 GHz in some embodiments.

Figure 7:
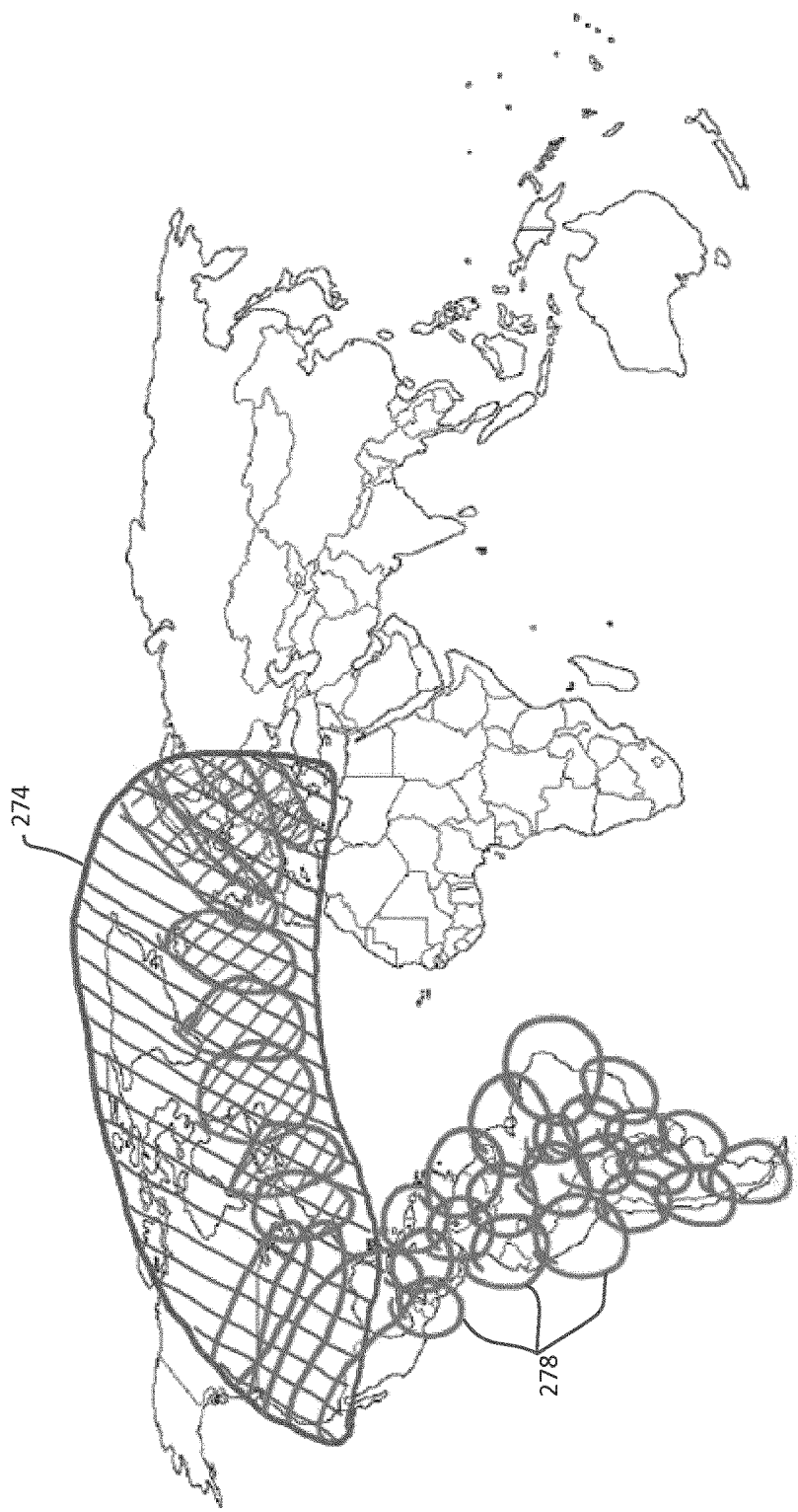
FIG. 7 is a schematic representation of a world map with an overlay showing satellite service.

As shown in FIG. 7, a single satellite (e.g., the satellite 18) can provide different services and/or beams for communication. In the illustrated example, the satellite provides a large first service 274 that in some examples provides an IPTV service operating between about 11.85 GHz and about 12.075 GHz, and a second service in the form of a set of data spot services 278 that in some examples provide a data communication service operating between about 10.95 GHz and about 12.2 GHz. By utilizing the beam splitting capabilities discussed above, the satellite communication system 38 can receive more than 1 GHz of bandwidth from a single satellite. The polarization and frequency/pointing diversity of the phased array module 158 allows for communication via multiple beams so that each individual beam avoids data or bandwidth throttling.

While the detailed drawings, specific examples, detailed algorithms and particular configurations given describe preferred and exemplary embodiments, they serve the purpose of illustration only. The inventions disclosed are not limited to the specific forms and reticles shown. For example, the methods may be performed in any of a variety of sequence of steps. The hardware and optical configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific mechanical components and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A satellite communication system comprising:
a plurality of antenna elements, each including a first polarization port communicating a first polarization signal, and a second polarization port communicating a second polarization signal; and
an interface circuit structured to
receive the plurality of first polarization signals,
amplify the plurality of first polarization signals,
split each of the plurality of first polarization signals into a first polarization primary signal and a first polarization secondary signal and apply independent phase shift and gain shifts to the first polarization primary signal and the first polarization secondary signal,
receive the plurality of second polarization signals,
amplify the plurality of second polarization signals,
split each of the plurality of second polarization signals into a second polarization primary signal and a second polarization secondary signal and apply independent phase shift and gain shifts to the second polarization primary signal and the second polarization secondary signal,
sum the plurality of first polarization primary signals and the plurality of second polarization primary signals for a first beam,
sum the plurality of first polarization secondary signals and the plurality of second polarization secondary signals for a second beam,
translate the first beam to a first intermediate frequency,
translate the second beam to a second intermediate frequency, and
combine the first beam and second beam onto a common cable,
wherein the first beam and the second beam are associated with different data sources.

2. The satellite communication system of claim 1, wherein the first beam and the second beam are associated with a single satellite.

3. The satellite communication system of claim 1, wherein the first beam is associated with a first satellite and the second beam is associated with a second satellite.

4. The satellite communication system of claim 1, wherein the first beam and the second beam are associated with one or more low earth orbit or geostationary earth orbit satellites.

5. The satellite communication system of claim 1, wherein the first polarization signal defines a vertical polarization.

6. The satellite communication system of claim 1, wherein the second polarization signal defines a horizontal polarization.

7. The satellite communication system of claim 1, wherein the interface circuit is configured to synthesize any polarization between vertical and horizontal, a left hand circular polarization or a right hand circular polarization.

8. The satellite communication system of claim 1, wherein the plurality of antenna elements and the interface circuit are implemented on four circuits cards, and
wherein the first beams from each of the circuit cards are combined to form one first beam signal and the second beams from each of the circuit cards are combined to form one second beam signal.

9. The satellite communication system of claim 1, wherein the plurality of antenna elements are receiving antenna elements and the interface circuit is a receiving interface circuit, and
further comprising a plurality of transmit antenna elements and a transmit interface circuit.

10. The satellite communication system of claim 9, wherein the plurality of transmit antenna elements and the transmit interface circuit are implemented on four circuits cards with a first transmit beam split to form four first transmit beam signals and a second transmit beam split to form four second transmit beam signals.

11. A satellite communication system comprising:
a plurality of antenna elements comprising respective first polarization ports communicating first polarization signals, and second polarization ports communicating second polarization signals;
a receive array structured to receive and sum the first polarization signals, and to receive and sum the second polarization signals; and
a transceiver including
a first splitter circuit structured to receive the summed first polarization signal and split the summed first polarization signal into a first signal and a second signal,
a second splitter circuit structured to receive the summed second polarization signal and split the summed second polarization signal into a third signal and a fourth signal,
a first beamformer structured to receive the first signal and the third signal and synthesize a first beamformed signal, and
a second beamformer structured to receive the second signal and the fourth signal and synthesize a second beamformed signal,
wherein the first beamformed signal and the second beamformed signal are associated with different data sources.

12. The satellite communication system of claim 11, wherein the first beamformed signal and the second beamformed signal are associated with a single satellite.

13. The satellite communication system of claim 11, wherein the first beamformed signal is associated with a first satellite and the second beamformed signal is associated with a second satellite.

14. The satellite communication system of claim 11, wherein the first beamformed signal and the second beamformed signal are associated with one or more low earth orbit or geostationary earth orbit satellites.

15. The satellite communication system of claim 11, wherein the receive array includes an interface circuit structured to
receive the plurality of first polarization signals,
amplify the plurality of first polarization signals,
split each of the plurality of first polarization signals into a first polarization primary signal and a first polarization secondary signal and apply independent phase shift and gain shifts to the first polarization primary signal and the first polarization secondary signal,
receive the plurality of second polarization signals, amplify the plurality of second polarization signals,
split each of the plurality of second polarization signals into a second polarization primary signal and a second polarization secondary signal and apply independent phase shift and gain shifts to the second polarization primary signal and the second polarization secondary signal, and
wherein the summed first polarization signal includes a sum of the plurality of first polarization primary signals and the plurality of second polarization primary signals, and
wherein the summed second polarization signal includes a sum of the plurality of first polarization secondary signals and the plurality of second polarization secondary signals.

16. The satellite communication system of claim 11, wherein the summed first polarization signal defines a vertical polarization.

17. The satellite communication system of claim 11, wherein the summed second polarization signal defines a horizontal polarization.

18. A satellite communication system comprising:
a plurality of antenna elements, each including a first polarization port communicating a first polarization signal, and a second polarization port communicating a second polarization signal;
an interface circuit structured to
receive the plurality of first polarization signals,
amplify the plurality of first polarization signals,
split each of the plurality of first polarization signals into a first polarization primary signal and a first polarization secondary signal and apply independent phase shift and gain shifts to the first polarization primary signal and the first polarization secondary signal,
receive the plurality of second polarization signals,
amplify the plurality of second polarization signals, and
split each of the plurality of second polarization signals into a second polarization primary signal and a second polarization secondary signal and apply independent phase shift and gain shifts to the second polarization primary signal and the second polarization secondary signal;
a first summer circuit structured to generate a first beam signal via a sum of the plurality of first polarization primary signals and the plurality of second polarization primary signals;
a second summer circuit structured to generate a second beam signal via a sum of the plurality of first polarization secondary signals and the plurality of second polarization secondary signals; and
a transceiver including
a first splitter circuit structured to receive the first beam signal and split the first beam signal into a first signal and a second signal,
a second splitter circuit structured to receive the second beam signal and split the second beam signal into a third signal and a fourth signal,
a first beamformer structured to receive the first signal and the third signal and synthesize a first beamformed signal, and
a second beamformer structured to receive the second signal and the fourth signal and synthesize a second beamformed signal,
wherein the first beamformed signal and the second beamformed signal are associated with different data sources.

19. The satellite communication system of claim 18, wherein the first beamformed signal and the second beamformed signal are associated with a single satellite.

20. The satellite communication system of claim 18, wherein the first beamformed signal is associated with a first satellite and the second beamformed signal is associated with a second satellite.

21. The satellite communication system of claim 18, wherein the first beamformed signal and the second beamformed signal are associated with one or more low earth orbit or geostationary earth orbit satellites.

22. The satellite communication system of claim 18, wherein the first polarization signal defines a vertical polarization.

23. The satellite communication system of claim 18, wherein the second polarization signal defines a horizontal polarization.

24. A satellite communication system comprising:
a plurality of antenna elements, each including a first polarization port communicating a first polarization signal, and a second polarization port communicating a second polarization signal; and
an interface circuit structured to
separate two data source signals on a common cable at intermediate frequencies into a first beam signal and a second beam signal,
translate the first beam signal to a first communications channel frequency,
translate the second beam signal to a second communications channel frequency, wherein the first communications channel frequency and the second communications channel frequency can be the same or different,
split the first beam signal into a plurality of first beam primary polarization signals and a plurality of first beam secondary polarization signals,
split the second beam signal into a plurality of second beam primary polarization signals and a plurality of second beam secondary polarization signals,
apply independent phase shifts and gain shifts to the plurality of the first beam primary polarization signals,
apply independent phase shifts and gain shifts to the plurality of the second beam primary polarization signals,
combine the first beam primary polarization signals and second beam primary polarization signals into a plurality of combined primary polarization signals,
amplify the plurality of combined primary polarization signals,
radiate the plurality of combined primary polarization signals,
apply independent phase shifts and gain shifts to the plurality of the first beam secondary polarization signals,
apply independent phase shifts and gain shifts to the plurality of the second beam secondary polarization signals,
combine the first beam secondary polarization signals and second beam secondary polarization signals into a plurality of combined secondary polarization signals,
amplify the plurality of combined secondary polarization signals, and
radiate the plurality of combined secondary polarization signals, wherein the first beam signal and the second beam signal are associated with different data sources.

\* \* \* \* \*